(12) United States Patent
Balenghien et al.

(10) Patent No.: US 9,995,372 B2
(45) Date of Patent: Jun. 12, 2018

(54) TRANSMISSION FOR A HYDRAULIC HYBRID VEHICLE, COMPRISING A PLANETARY GEAR TRAIN LINKED TO A PUMP BY A SPEED REDUCER

(71) Applicant: TECHNOBOOST, Paris (FR)

(72) Inventors: Olivier Balenghien, Le Raincy (FR); Jean Christian Sirot, Paris (FR)

(73) Assignee: TECHNOBOOST, Paris (FR)

( * ) Notice: Subject to any disclaimer, the term of this patent is extended or adjusted under 35 U.S.C. 154(b) by 197 days.

(21) Appl. No.: 14/890,141

(22) PCT Filed: Apr. 30, 2014

(86) PCT No.: PCT/FR2014/051037
§ 371 (c)(1),
(2) Date: Nov. 9, 2015

(87) PCT Pub. No.: WO2014/184461
PCT Pub. Date: Nov. 20, 2014

(65) Prior Publication Data
US 2016/0091060 A1 Mar. 31, 2016

(30) Foreign Application Priority Data
May 16, 2013 (FR) ...................... 13 54409

(51) Int. Cl.
*B60W 20/17* (2016.01)
*F16H 57/00* (2012.01)
(Continued)

(52) U.S. Cl.
CPC ............... *F16H 3/72* (2013.01); *B60W 20/17* (2016.01); *F16H 47/04* (2013.01);
(Continued)

(58) Field of Classification Search
CPC . B60W 20/17; F16H 57/0006; F16H 61/4183
See application file for complete search history.

(56) References Cited

U.S. PATENT DOCUMENTS

| 4,895,049 A | 1/1990 | Kita et al. | |
| 5,317,873 A * | 6/1994 | Okuda | F04B 1/2042 |
| | | | 417/269 |

(Continued)

FOREIGN PATENT DOCUMENTS

| DE | 3707382 A1 | 9/1988 |
| EP | 0559003 A1 | 9/1993 |

(Continued)

OTHER PUBLICATIONS

International Search Report for corresponding PCT/FR2014/051037 dated Jul. 8, 2014.

*Primary Examiner* — Tisha D Lewis
(74) *Attorney, Agent, or Firm* — Sandberg Phoenix & von Gontard

(57) ABSTRACT

A transmission for a hydraulic hybrid motor vehicle includes a planetary gear train (30) capable of differential operation. The planetary gear train has a first element (32) linked to an internal combustion engine (34), a second element (40) linked to drive wheels (22) of the vehicle, and a third element (36) linked to a hydraulic pump (64). The transmission (1) further includes a hydraulic machine which drives the drive wheels (22) by way of a link between the third element (36) of the planetary gear train (30) and the hydraulic pump (64). This link includes a speed reducer (38, 60) that provides, when the whole of the planetary gear train is rotating at the same speed, a reduction in the speed of rotation of the pump relative to that of the internal combustion engine (34) that is greater than a value of approximately two.

15 Claims, 1 Drawing Sheet

(51) Int. Cl.
*F16H 3/72* (2006.01)
*F16H 61/4183* (2010.01)
*F16H 47/04* (2006.01)
*F16H 37/08* (2006.01)

(52) U.S. Cl.
CPC ...... *F16H 61/4183* (2013.01); *B60Y 2306/09* (2013.01); *F16H 57/0006* (2013.01); *F16H 2037/0866* (2013.01)

(56) References Cited

U.S. PATENT DOCUMENTS

| | | | |
|---|---|---|---|
| 5,333,453 A * | 8/1994 | Okuda | F04B 1/2042 60/487 |
| 5,346,316 A | 9/1994 | Okada et al. | |
| 2017/0074297 A1 * | 3/2017 | Olson | F04C 29/06 |

FOREIGN PATENT DOCUMENTS

| | | |
|---|---|---|
| FR | 297440 A1 | 7/2012 |
| FR | 2973302 A1 | 10/2012 |
| WO | 2012006492 A1 | 1/2012 |

\* cited by examiner

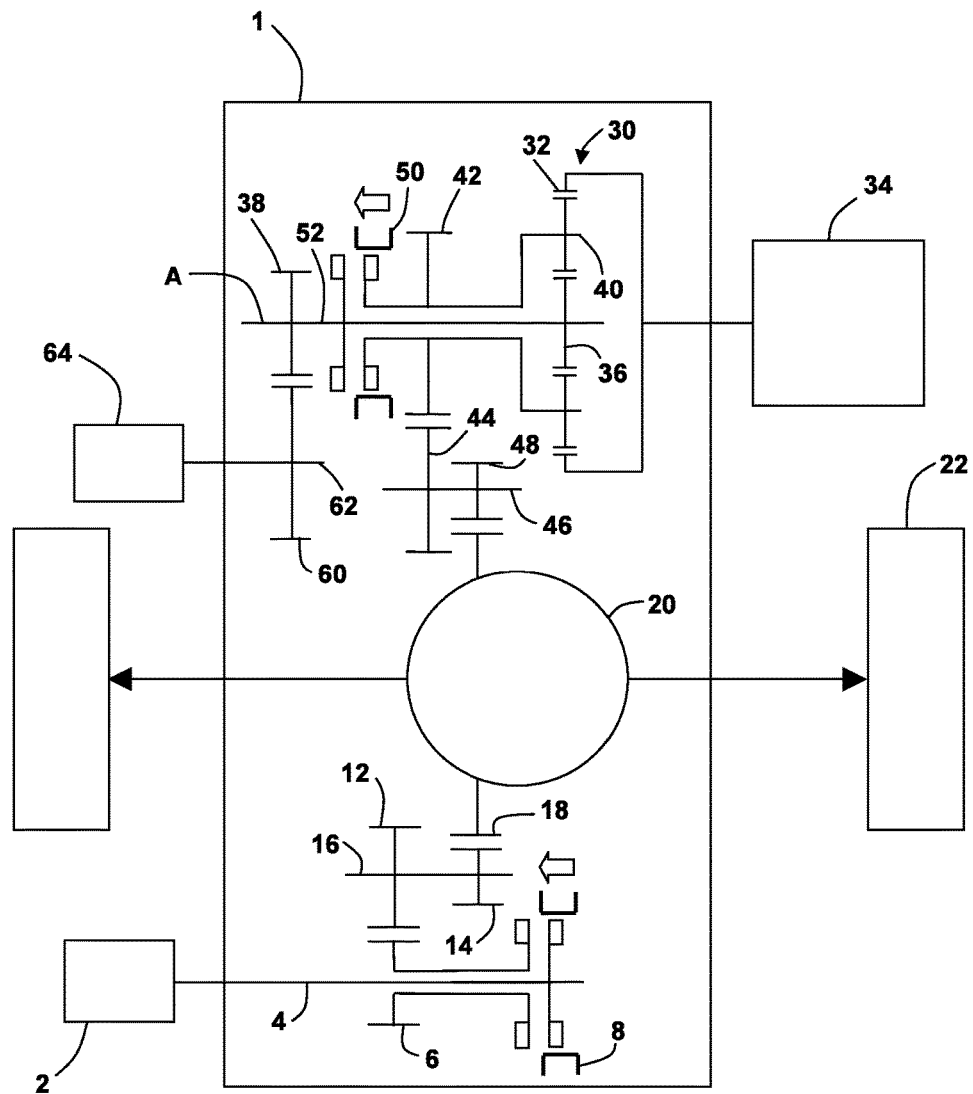

TRANSMISSION FOR A HYDRAULIC HYBRID VEHICLE, COMPRISING A PLANETARY GEAR TRAIN LINKED TO A PUMP BY A SPEED REDUCER

CROSS-REFERENCE TO RELATED APPLICATIONS

The present application is the US National Stage under 35 USC § 371 of PCT/FR2014/051037, which in turn claims priority to French Application Number 1354409 which was filed on May 16, 2013.

BACKGROUND

The present invention relates to a transmission for a hybrid automotive vehicle that reduces the sound level of a hydraulic pump driven by the transmission, to a method for estimating the noise level of a hydraulic machine, and to a hybrid automotive vehicle comprising the transmission.

A known type of transmission for a hydraulic hybrid automotive vehicle is described in particular in document FR-A1-2973302. The transmission disclosed therein has a first input connected to a combustion engine and a second input connected to a hydraulic pump. The motor and pump are aligned on the same axis and disposed on either side of a planetary gear set integrated in the transmission. This transmission further comprises a third input connected to a hydraulic machine, and an output through a differential to provide power to the two driving wheels of the vehicle.

The hydraulic machine can be connected to the differential through two different gear ratios, selectable by means of a first synchronizer sleeve.

The outer ring gear of the planetary gear set, arranged along the axis of the combustion engine, is driven by the combustion engine and comprises a sun gear directly connected to the hydraulic pump. The planet carrier of the planetary gear set can be connected to the sun gear by a second synchronizer sleeve in order to lock the planetary gear set, so that all of its elements rotate at the same speed. The planet carrier can also be connected to the output differential by a third synchronizer sleeve.

The hydraulic machine and the pump are connected to pressure accumulators which store energy when the pump delivers a braking torque and which return the energy to the hydraulic machine in order to deliver engine torque to the driving wheels.

When the planet carrier is locked, the pump runs at the same speed as the combustion engine. In another operating mode, when the planet carrier functions as a differential, the pump rotates in the opposite direction relative to the combustion engine and generates a braking torque. The pump rotates at a speed which may be lower or higher than the engine speed.

When the pump operates at a relatively high rotational speed and has a cylinder displacement calculated based on this speed, the pump receives mechanical power depending on the product of speed and displacement, which is used to generate the hydraulic pressure for recharging the pressure accumulators.

In addition, a known type of hydraulic pump comprises cylinders arranged parallel to the axis and distributed around this axis and comprises pistons actuated by a plate driven in rotation and capable of tilting around an axis perpendicular to the axis of rotation.

A problem with the above described type of pump used for hybrid vehicles is that at these speeds the pump generates unpleasant vibrations and loud noises. In particular, tests conducted on a prototype of the vehicle have shown that the sound level emitted by the pump exceeds the allowable limit by approximately 10 dBa.

To reduce the noise level of the pump, a first known solution consists in slightly tilting the plate along a second axis perpendicular to the first tilt axis in order to smooth the pressure peaks in the pistons and to reduce the sound excitation. However, this solution only provides a reduction of approximately 3 to 4 dBa of the overall noise of the hydraulic pump and is not sufficient.

Another known solution to reduce noise emissions consists in encapsulating the hydraulic pump. This solution entails a significant space problem for the encapsulation, making it difficult to implement.

SUMMARY

The present invention is intended to avoid these disadvantages of the prior art.

It proposes for this purpose a transmission for a hydraulic hybrid automotive vehicle comprising a planetary gear set that can function as a differential. The planetary gear seat includes a first element connected to a combustion engine, a second element connected to the driving wheels of the vehicle, and a third element connected to a hydraulic pump. The transmission comprises a means for delivering torque, supplied by a hydraulic machine, to the driving wheels and is characterized in that the connection between the third element of the planetary gear set and the hydraulic pump comprises a speed reducer which, when the entire planetary gear set rotates at the same speed, reduces the rotational speed of the pump relative to the speed of the combustion engine, with a ratio greater than approximately two.

An advantage of this transmission is that by adding a speed reducer between the third element of the planetary gear set and the hydraulic pump, a reduction is obtained of at least two of the speed of the pump relative to the speed of the combustion engine when the planetary gear set is locked, which significantly reduces the noise emissions of the pump. The same reduction of the pump speed is also obtained when the planetary gear set functions as a differential.

In addition, to maintain the same power, the reduction in speed can be compensated by an increase in pump displacement substantially proportional to the reduction ratio.

The transmission can further comprise one or more of the following characteristics, which can be combined.

Advantageously, the speed reducer comprises two parallel shafts which define the input and the output shafts of the speed reducer.

In particular, the input shaft of the speed reducer, which is directly linked to the third element of the planetary gear set, can support a gear meshing with another gear carried by a shaft which is directly connected to the pump so that the reduction ratio is obtained through this pair of meshing gears.

In particular, the reduction ratio can be approximately 2.2.

In particular, the first element of the planetary gear set can be the ring gear, the second element can be the planet carrier and the third element can be the sun gear.

Advantageously, the planetary gear set comprises a locking means.

The invention also relates to a method for evaluating the noise level of a hydraulic machine with axial pistons, which evaluates the noise level by knowing the rotational speed and the displacement of the hydraulic machine, and which calculates the noise level by means of an equation of the following type:

$$X \times \log_{10}(\text{Speed rev/min}) + Y \times \log_{10}(\text{Displacement in cm}^3) + K = \text{noise level in dBa;}$$

with the constant K depending on the technology used for the hydraulic machine.

In particular, the "X" value is substantially equal to twenty, and the value "Y" value is substantially equal to three.

In particular, the constant "K" is between five and fifteen.

The invention further relates to a hybrid automotive vehicle equipped with a transmission comprising a planetary gear set connected to a combustion engine and to a hydraulic pump, wherein the transmission comprises any one of the preceding characteristics.

The goal of the invention is also a method for evaluating the noise level of a hydraulic machine with axial pistons disposed in a transmission for a hydraulic hybrid automotive vehicle. The transmission comprises a planetary gear set capable of functioning in a differential mode. The planetary gear set comprises a first element connected to a combustion engine, a second element connected to driving wheels, and a third element connected to a hydraulic pump. The transmission additionally comprises a means for driving the driving wheels by a hydraulic machine and an output differential. The connection between the output differential and the hydraulic machine comprises a speed reducer that reduces the rotational speed of the hydraulic machine when the hydraulic machine drives the driving wheels. The method is used to evaluate the noise level, knowing the rotational speed and the displacement of the hydraulic machine. The method is remarkable in that it calculates the noise level by an equation of the type:

$$X' \times \log_{10}(\text{speed in rev/min}) + Y' \times \log_{10}(\text{displacement in cm3}) + K' = \text{noise level in dBa;}$$

where K' is a constant depending on the technology used for the hydraulic machine.

The goal of the invention is also a transmission for a hydraulic hybrid automotive vehicle, wherein the transmission comprises a planetary gear set that can function in a differential mode. The planetary gear set comprises a first element connected to a combustion engine, a second element connected to the driving wheels, and a third element connected to a hydraulic pump. The transmission additionally comprises means for driving the driving wheels by a hydraulic machine and an output differential, and the connection between the output differential and the hydraulic machine comprises a speed reducer that reduces the rotational speed of the hydraulic machine when the hydraulic machine drives the driving wheels. The transmission is remarkable in that the value of this reduction corresponds with a noise level of the hydraulic machine evaluated by a method as succinctly described above.

DESCRIPTION OF THE DRAWINGS

The invention will be better understood and other features and advantages will appear more clearly upon reading the following description given as an example, with reference to the accompanying drawing of FIG. 1 which is a diagram of a transmission according to the invention.

DETAILED DESCRIPTION

FIG. 1 shows a transmission 1 comprising six shafts arranged parallel to each other. A variable displacement hydraulic machine 2 is connected to a first input shaft 4 of the transmission, which supports a freely rotating drive gear 6 that can be connected to the input shaft by engaging a first synchronizer sleeve 8.

The drive gear 6 of the first input shaft 4 meshes with a driven gear 12 connected to a first intermediate shaft 16, which carries a first output gear 14 fixed on the intermediate shaft 16. The first output gear 14 meshes with a ring gear 18 of an output differential 20, in order to distribute the power to the two driving wheels 22 of the vehicle.

This makes it possible for the hydraulic machine 2 to directly drive the driving wheels 22 of the vehicle when the first synchronizer sleeve 8 is engaged.

An internal combustion engine 34, arranged along the main axis A, directly drives an outer ring gear 32 of a planetary gear set 30 disposed along the same main axis A. The planetary gear set comprises a central sun gear 36 which is fixed to a shaft 52 carrying a fixed gear 38 at its end opposite to the engine.

The planetary gear set 30 includes a planet carrier 40 with planet gears meshing with both the ring gear 32 and the sun gear 36. The planet carrier is connected to a fixed driving gear 42.

When engaged, a second synchronization sleeve 50 installed axially between the fixed driving gear 42 of the planet carrier 40 and the fixed gear 38 of the shaft 52 on which the sun gear 36 is mounted, connects the planet carrier 40 with the sun gear 36. The planetary gear set 30 is then locked and all of its elements rotate at the same speed.

The fixed driving gear 42 of the planetary carrier 40 meshes with a fixed driven gear 44 which is connected to a second intermediate shaft 46 on which a second fixed output gear 48 is mounted. This second output gear 48 meshes with the ring gear 18 of the output differential 20.

This makes it possible for the combustion engine 34 to directly drive the driving wheels 22 of the vehicle when the second synchronization sleeve 50 is engaged. The connection between the combustion engine 34 and the driving wheels 22 is then made with a gear ratio defined by the two successive meshing gear sets, resulting in a small speed reduction. This ratio is the longest ratio, it is used for high vehicle speeds with good efficiency because it employs only a mechanical transmission comprising only two pairs of meshing gears.

The gear 38 fixed to the shaft 52 meshes with a driven gear 60 fixed to the pump shaft 62, which is permanently connected to a variable displacement hydraulic pump 64.

When the second synchronization sleeve 50 is disengaged, the planetary gear set 30 functions as a differential distributing the torque of the combustion engine 34, by delivering a first torque applied by the planet carrier 40 to the output differential 20, and a second torque applied by the sun gear 36 to the pump 64.

The pump 64 and the hydraulic machine 2 are connected to high pressure and low pressure accumulators, which constitute energy reserves.

The driving gear 38 fixed to the shaft 52 of the sun gear 36 and the driven gear 60 fixed to the pump shaft 62 constitute a speed reducer which in this example reduces the rotational speed of the pump 64 by a ratio of 2.2. In this way, when the combustion engine 34 rotates at a speed of 3000 rev/min, and the second synchronization sleeve 50 is engaged, the pump 64 rotates at a speed of 1364 rev/min.

Subsequently, to compensate for the reduction in speed and to obtain a substantially equivalent mechanical power, the displacement of the pump 64 is increased. In this way, a less noisy pump 64 is obtained.

Through a series of tests of several hydraulic pumps offered by different vendors, having pistons arranged parallel to the axis, the following mathematical relationship was established to estimate the acoustic level of these machines:

$$20 \times \log_{10}(\text{Speed rev/min}) + 3 \times \log_{10}(\text{Displacement in cm}^3) + K = \text{noise level in dBa};$$

where the constant K is between 5 and 15 according to the technology of the hydraulic machine.

In practice, for a hydraulic pump having a capacity of 17 cm³ and rotating at a speed of 3000 rev/min, with a constant K=9.8, a sound level of 83 dBa is obtained with this mathematical relationship. With the same type of pump having a displacement of 31 cm³, installed in a transmission 1 according to the invention comprising the 2.2 reduction ratio, a sound/noise level is obtained of 77 dBa, or a reduction of approximately 6 dBa.

Note that the displacement of the pump 64 is multiplied by a value slightly smaller than two, which is close to the reduction ratio of the gears driving the pump 64. Since the loss of the pump 64 is not proportional to its displacement, the mechanical power of the pump and its performance are similar to those of the original pump at the reduced displacement and higher speed.

Using a similar calculation method in order to predict the noise level, the speed of the hydraulic machine 6, comprising radial pistons, can be reduced to lower the noise.

In general, this calculation method provides in a simple manner a good estimate of the sound/noise level of a hydraulic machine with axial pistons, as a function of its displacement and its rotational speed, and can be used to calculate the reduction ratio required for driving the machine.

The invention claimed is:

1. A method for evaluating the noise level of a hydraulic machine with axial pistons installed in a transmission of a hydraulic hybrid automotive vehicle; the vehicle having driving wheels and a combustion engine; said transmission comprising a planetary gear set which can function as a differential; the planetary gear set comprising a first element connected to said combustion engine, a second element connected to the driving wheels, and a third element connected to a hydraulic pump; said transmission additionally comprising means for delivering torque supplied by a hydraulic pump to the driving wheels; and wherein a connection between the third element of the planetary gear set and the hydraulic pump comprises a speed reducer which reduces the rotational speed of the pump relative to the speed of the combustion engine when all of the elements of the planetary gear set run at the same speed; the method comprising determining the noise level of the hydraulic machine as a function of the $\text{Log}_{10}$ of the rotational speed of the hydraulic machine, the $\text{Log}_{10}$ of the displacement of the hydraulic machine, and a constant.

2. A transmission for a hydraulic hybrid automotive vehicle having driving wheels and a combustion engine; the transmission comprising a planetary gear set which can function as a differential; the planetary gear set comprising a first element connected to the combustion engine, a second element connected to the driving wheels, and a third element connected to a hydraulic pump; said transmission additionally comprising a hydraulic machine adapted to drive the driving wheels; and wherein a connection between the third element of the planetary gear set and the hydraulic pump comprises a speed reducer which reduces the rotational speed of the pump relative to the speed of the combustion engine when all of the elements of the planetary gear set run at the same speed; wherein the value of said reduction of the rotational speed of the pump corresponds to a noise level of the hydraulic pump; said noise level of the hydraulic pump being determined via the following equation:

$$X \times \log_{10}(\text{Speed rev/min}) + Y \times \log_{10}(\text{Displacement in cm}^3) + K = \text{noise level in dBA};$$

with the constant K being between 5 and 15.

3. The transmission according to claim 2, wherein the speed reducer comprises two parallel shafts; said two shafts defining input and output shafts of the speed reducer.

4. The transmission according to claim 3, wherein the speed reducer input shaft is directly connected to the third element of the planetary gear set and carries a driving gear which meshes with a driven gear carried by the output shaft of the speed reducer, and wherein the output shaft is directly connected to the pump; wherein these two gears define a reduction ratio of the speed reducer.

5. The transmission according to claim 4 wherein the reduction ratio is approximately 2.2.

6. The transmission according to claim 2, wherein the first element of the planetary gear set is a ring gear, the second element is a planet carrier, and the third element is a sun gear.

7. The transmission according to claim 2 wherein the planetary gear set comprises a locking means.

8. The method according to claim 1, wherein the noise level of the hydraulic machine is calculated by the equation:

$$X' \times \text{Log}_{10}(\text{speed in rev/min}) + Y' \times \text{Log}_{10}(\text{displacement in cm}^3) + K' = \text{noise level in dBa}.$$

where K' is the constant and is between 5 and 15.

9. A transmission for a hydraulic hybrid automotive vehicle comprising a planetary gear set capable of functioning in differential mode; said planetary gear set comprising a first element connected to a combustion engine, a second element connected to the driving wheels and a third element connected to a hydraulic pump; said transmission further comprising means for driving the driving wheels, said means comprising a hydraulic machine and an output differential; a connection between the output differential and the hydraulic machine comprising a speed reducer that reduces the rotational speed of the hydraulic machine when the hydraulic machine drives the driving wheels; wherein the value of said reduction in speed of the hydraulic machine corresponds with a noise level of the hydraulic machine evaluated according to the equation:

$$X' \times \text{Log}_{10}(\text{speed in rev/min}) + Y' \times \text{Log}_{10}(\text{displacement in cm}^3) + K' = \text{noise level in dBa},$$

where K' is a constant between 5 and 15.

10. The transmission according to claim 8, wherein said transmission is incorporated in a hybrid automotive vehicle.

11. The method of claim 1, wherein the noise level of the hydraulic machine is calculated according to the following equation:

$$X \times \log_{10}(\text{Speed rev/min}) + Y \times \log_{10}(\text{Displacement in cm}^3) + K = \text{noise level in d BA};$$

wherein, the K is the constant and is between 5 and 15.

12. The method according to claim 11 wherein X is 20 and Y is 3, such that the noise level of the hydraulic machine in dBa is calculated by the equation:

$$20 \text{Log}_{10}(\text{speed in rev/min}) + 3 \text{Log}_{10}(\text{displacement in cm}^3) + K.$$

13. The method according to claim 8 wherein X' is 20 and Y' is 3, such that the noise level of the hydraulic machine in dBa is calculated by the equation:

$20\mathrm{Log}_{10}$(speed in rev/min)$+3\mathrm{Log}_{10}$(displacement in cm$^3$)$+K'$.

14. The method according to claim 1 further comprising a step of controlling the speed of the hydraulic pump in response to the calculated noise level of the pump.

15. The method for evaluating the noise level of the hydraulic machine according to claim 11, wherein the value "X" is substantially equal to twenty, and the "Y" value is substantially equal to three.

* * * * *